(12) United States Patent
Shin

(10) Patent No.: US 12,719,065 B2
(45) Date of Patent: Aug. 25, 2026

(54) SEPARATOR INTEGRATED WITH GASKET FOR FUEL CELL AND METHOD FOR MANUFACTURING THE SAME

(71) Applicants: Hyundai Motor Company, Seoul (KR); Kia Corporation, Seoul (KR)

(72) Inventor: Sun Do Shin, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 718 days.

(21) Appl. No.: 17/864,592

(22) Filed: Jul. 14, 2022

(65) Prior Publication Data

US 2023/0066335 A1 Mar. 2, 2023

(30) Foreign Application Priority Data

Aug. 26, 2021 (KR) ........................ 10-2021-0113503

(51) Int. Cl.
*H01M 8/0276* (2016.01)
*H01M 8/0247* (2016.01)
*H01M 8/0286* (2016.01)

(52) U.S. Cl.
CPC ....... *H01M 8/0276* (2013.01); *H01M 8/0247* (2013.01); *H01M 8/0286* (2013.01)

(58) Field of Classification Search
None
See application file for complete search history.

(56) References Cited

U.S. PATENT DOCUMENTS

2012/0251918 A1* 10/2012 Morimoto ........... H01M 8/2483 429/482
2015/0228987 A1* 8/2015 Andreas-Schott .. H01M 8/0276 429/457
2016/0141636 A1* 5/2016 Kadono ............. H01M 8/0228 429/469

FOREIGN PATENT DOCUMENTS

JP 2019185922 A * 10/2019
KR 10-2011-0039609 A 4/2011
KR 10-2020-0022998 A 3/2020
KR 10-2020-0120433 A 10/2020
KR 10-2226806 B1 3/2021

OTHER PUBLICATIONS

JP2019185922A—Machine Translation (Year: 2019).*
Office Action issued on May 15, 2026 in Korean patent application No. 10-2021-0113503.

* cited by examiner

*Primary Examiner* — Brian R Ohara
*Assistant Examiner* — Patrick Marshall Greene
(74) *Attorney, Agent, or Firm* — Fox Rothschild LLP

(57) ABSTRACT

A separator with integrated gasket including a first gasket part bonded to a separator by seating the separator formed with a burring part on a lower core, moving and assembling a mold including a slide core, and injecting molten resin into a cavity and then cooling it, and a second gasket part bent from the first gasket part and not bonded to the separator may be molded and taken out. The fastening part and the burring part may be fitted and fastened by rotating the second gasket part of the taken-out separator with the integrated gasket.

5 Claims, 11 Drawing Sheets

202a
203
202
200
202b
101
201
100

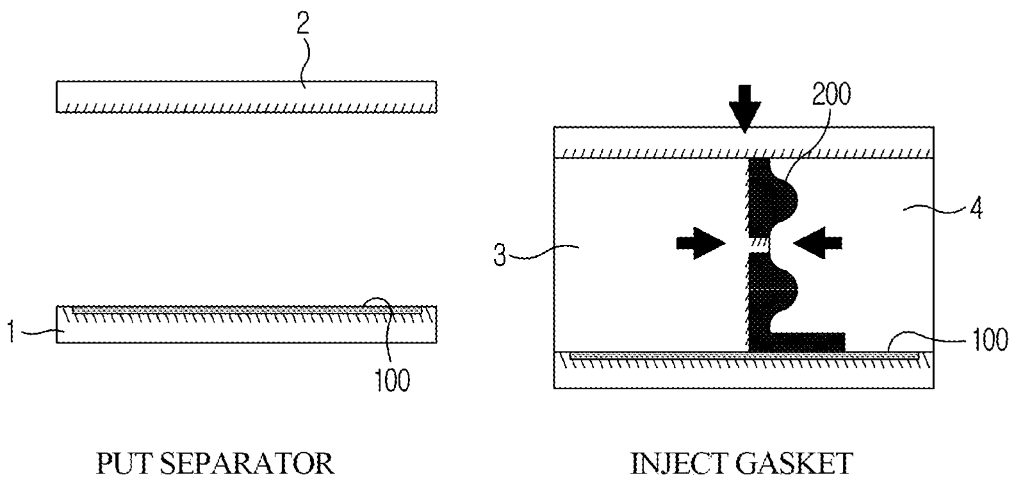
FIG. 5(a)
FIG. 5(b)
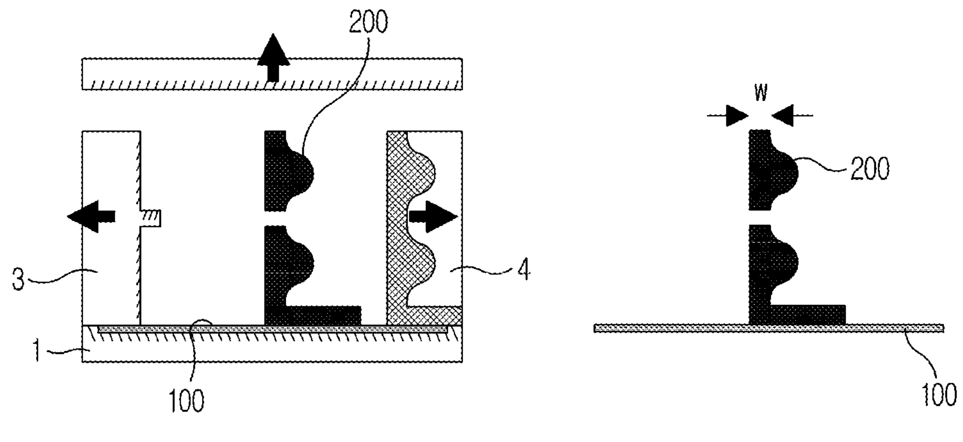
FIG. 5(c)
FIG. 5(d)

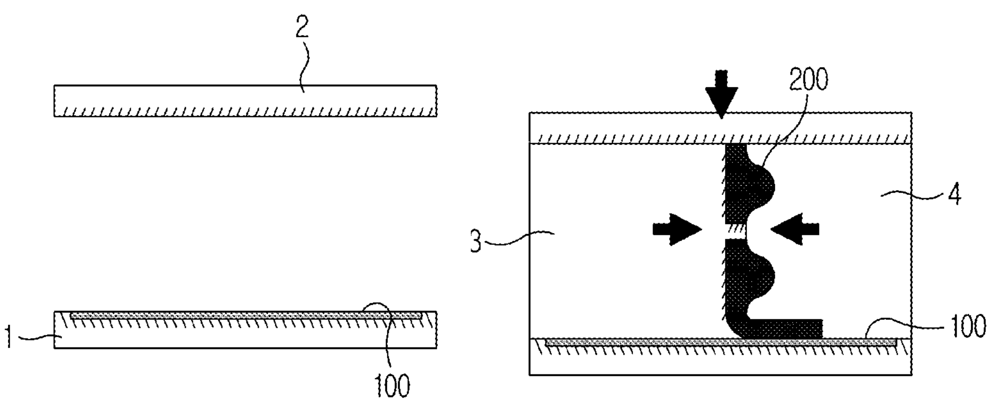
PUT SEPARATOR
FIG. 7(a)
INJECT GASKET
FIG. 7(b)
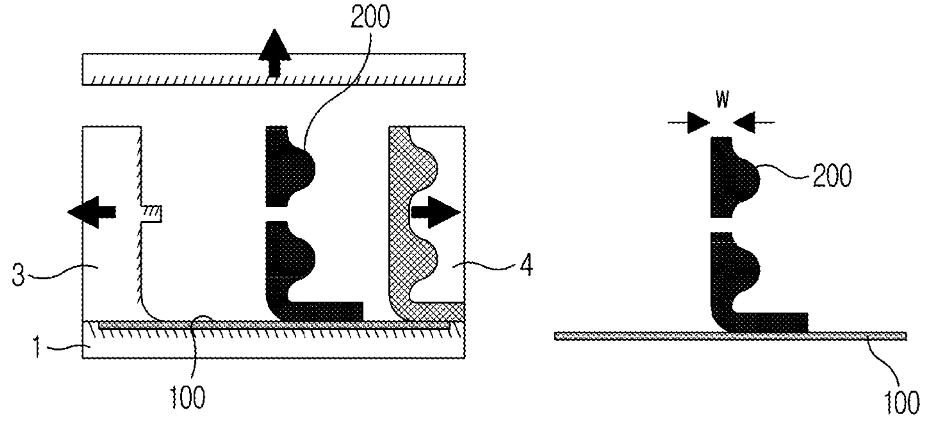
RELEASE
FIG. 7(c)
COMPLETE MOLDING
FIG. 7(d)

SEPARATOR INTEGRATED WITH GASKET FOR FUEL CELL AND METHOD FOR MANUFACTURING THE SAME

CROSS REFERENCE TO RELATED APPLICATION

The present application claims under 35 U.S.C. § 119(a) the benefit of Korean Patent Application No. 10-2021-0113503 filed on Aug. 26, 2021, the entire contents of which may be incorporated herein for all purposes by this reference.

BACKGROUND OF THE DISCLOSURE

Field of the Disclosure

The present disclosure relates to a separator integrated with a gasket and a method for manufacturing the same, and more specifically, to a separator integrally formed with a gasket provided for airtightness in a cell of a fuel cell and a method for manufacturing the same.

Description of the Related Art

A fuel cell is a kind of a power generator formed to electrochemically react chemical energy of a fuel in a stack to convert it into electric energy.

A general unit cell of the fuel cell has a membrane-electrode assembly (MEA) located on the innermost thereof, and the membrane-electrode assembly may be composed of a polymer electrolyte membrane capable of moving protons, and a catalyst layer, that is, an anode and a cathode applied to both surfaces of the electrolyte membrane so that hydrogen and oxygen can react.

Further, a gas diffusion layer (GDL) may be stacked on an outer portion of the membrane-electrode assembly, that is, an outer portion where the anode and the cathode may be located, and a separator formed with a flow field to supply a fuel and discharge the water generated by the reaction may be located on the outside of the gas diffusion layer.

In general, a fuel cell stack has hundreds of unit cells repeatedly stacked therein, and the unit cell may be composed of the membrane-electrode assembly, the gas diffusion layer (GDL), the separator, and a gasket. In particular, to secure an airtightness space of a reaction surface (cathode and anode) and a cooling surface, a method in which the gasket made of a rubber material may be insert-injected into the separator may be used.

When the separator is conventionally molded, the gasket may be manufactured in a method for putting the separator into a mold and then moving the mold vertically to inject the gasket. In general, a method for seating a metal separator formed with the flow field into a mold, and putting and injecting a liquid rubber material into the mold to harden and bond it on a surface of the metal separator may be generally applied.

In this regard, FIG. 1 shows a process of manufacturing a conventional separator with integrated gasket. In a state where a separator 10 may be seated on a low mold (LM), the separator formed with a gasket 20 may be taken out by moving downward an upper mold (UM) with a cavity corresponding to a shape of the gasket, injecting the molten resin into the cavity to charge the cavity, and then moving upward the upper mold (UM) after cooling.

However, in case of manufacturing the gasket in an insert injection method, there may be a chronic problem in that the separator may be deformed or a gasket burr overflows.

The foregoing explained as the background is intended merely to aid in the understanding of the background of the present disclosure, and is not intended to mean that the present disclosure falls within the purview of the related technology that may be already known to those skilled in the art.

SUMMARY OF THE DISCLOSURE

The present disclosure may solve the above problem, and an object of the present disclosure may be to provide a method for manufacturing a separator integrated with a gasket for a fuel cell capable of improving the moldability of a gasket and thinning the gasket by providing a device with a slide core divided and installed in a mold.

Further, according to an exemplary embodiment of the present disclosure, an object of the present disclosure may be to provide a structure of a separator integrated with a gasket for a fuel cell, which may integrally manufacture a gasket and a separator by forming a fixing device capable of fixing the gasket to the separator in advance, and fitting the gasket into the corresponding fixing device, thereby preventing the gasket from being pushed to improve the airtightness of a fuel cell stack and improve the durable quality thereof. A method for manufacturing a separator integrated with a gasket according to the present disclosure includes seating the separator formed with a burring part on a lower core; moving an upper core, a first slide core, and a second slide core in a mold closing direction to assemble a cavity in a preset shape in a mold; injecting molten resin into the cavity; cooling the molten resin to form the separator integrated with the gasket comprising a first gasket part bonded to the separator by cooling the molten resin and a second gasket part bent from the first gasket part and not bonded to the separator; and taking out that moving the upper core, the first slide core, and the second slide core in a mold opening direction, and moving the separator integrated with the gasket from the cavity.

The first slide core may include a projection protruding toward the second slide core, and a fastening hole may be formed in the second gasket part by the projection.

The second slide core may be formed with a first groove portion and a second groove portion extending vertically, and the second gasket part may be formed with a first sealing concave portion and a second sealing concave portion with the fastening hole interposed therebetween by the first groove portion and the second groove portion.

The method may further include fitting the burring part into the fastening hole by moving the second gasket part of the separator integrated with the gasket.

The first slide core and the second slide core may have a core lower shape so that a bending portion between the first gasket part and the second gasket part may be formed to be round upon closing the mold.

The burring part of the separator seated on the lower core may be processed on the separator in advance so that a cylindrical first flange portion extends vertically and a ring-shaped second flange portion formed to be horizontally bent extends outward from the first flange portion.

Further, a separator integrated with a gasket for a fuel cell according to an exemplary embodiment of the present disclosure includes a separator formed with at least one burring part; a first gasket part bonded to the separator; and a second gasket part integrally formed with the first gasket part, and the second gasket part bent from the first gasket part and not bonded to the separator, in which the second gasket part may be formed with a fastening hole of the number corresponding to the number of burring parts to be fitted into the burring part.

The burring part may be composed of a plurality of burring parts aligned and formed at regular intervals, and the fastening hole may be composed of a plurality of fastening holes aligned and formed at intervals corresponding to the plurality of burring parts.

The second gasket part may include a first sealing concave portion and a second sealing concave portion formed with the plurality of fastening holes formed in a row interposed therebetween, and the first sealing concave portion and the second sealing concave portion may be formed to extend in a direction in which the fastening holes may be aligned.

The first gasket part and the second gasket part may be connected to each other by a bending portion, and the second gasket part may be fixed by the burring part of the separator by rotating the second gasket part toward the separator to fit the burring part into the fastening hole, based on the bending portion.

The bending portion may have upper and lower surfaces, which connect the first gasket part and the second gasket part, respectively, in a rounded shape.

The burring part may include a cylindrical first flange portion extending vertically and a ring-shaped second flange portion formed to horizontally extend outward from the first flange portion.

According to the separator integrated with the gasket for the fuel cell according to the present disclosure, it may be possible to prevent the separator from being deformed and the burr from overflowing due to the flow resistance generated upon injecting the gasket, thereby improving the productivity of the separator.

Further, according to an exemplary embodiment of the present disclosure, it may be possible to reduce the height of the gasket upon injecting the gasket, thereby reducing the pitch of the cell and miniaturizing the fuel cell stack.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 5(*a*)-5(*d*) sequentially show a process of manufacturing the separator integrated with the gasket for the fuel cell according to an exemplary embodiment of the present disclosure;

FIGS. 7(*a*)-7(*d*) sequentially show a process of manufacturing a separator integrated with a gasket for a fuel cell according to an exemplary embodiment of the present disclosure;

DETAILED DESCRIPTION OF THE DISCLOSURE

Figures 1, 2A:
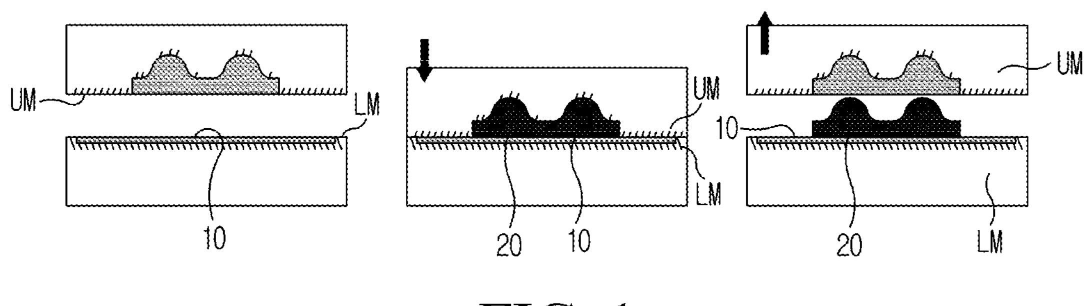
FIG. 1 is a diagram showing a process of manufacturing a conventional separator with an integrated gasket
FIG. 2A is a cross-sectional diagram showing a configuration just after the injection as a configuration of a separator integrated with a gasket for a fuel cell according to an exemplary embodiment of the present disclosure.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms “a,” “an” and “the” are intended to include the plural forms as well, unless the context clearly indicates otherwise. These terms are merely intended to distinguish one component from another component, and the terms do not limit the nature, sequence or order of the constituent components. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Throughout the specification, unless explicitly described to the contrary, the word “comprise” and variations such as “comprises” or “comprising” will be understood to imply the inclusion of stated elements but not the exclusion of any other elements. In addition, the terms “unit”, “-er”, “-or”, and “module” described in the specification may mean units for processing at least one function and operation, and can be implemented by hardware components or software components and combinations thereof.

Although an exemplary embodiment is described as using a plurality of units to perform the exemplary process, it is understood that the exemplary processes may also be performed by one or a plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN). Exemplary embodiments described herein may include a controller for controlling the movement of the mold portions, closing the mold, the injection of the resin, the cooling time and/or monitoring, and/or the opening of the mold.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term"about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

Hereinafter, a separator integrated with a gasket for a fuel cell and a method for manufacturing the same according to an exemplary embodiment of the present disclosure will be described in detail with reference to the accompanying drawings.

Figure 2B:
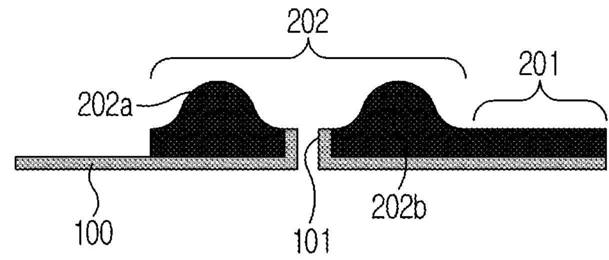
FIG. 2B is a cross-sectional diagram showing the separator integrated with the gasket for the fuel cell manufactured by fitting a hole formed in the gasket of FIG. 2A into a burring.
Figure 2C:
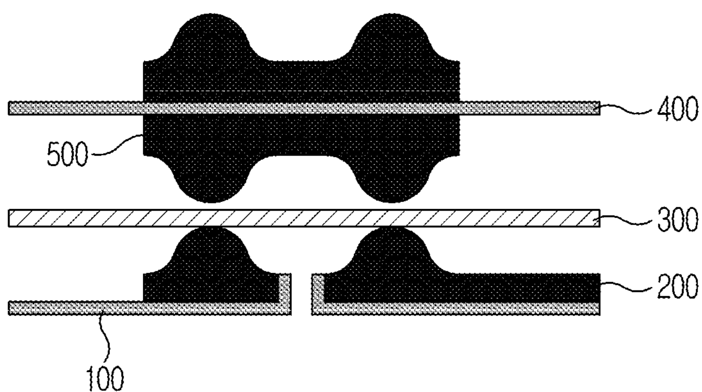
FIG. 2C shows that the separator integrated with the gasket for the fuel cell manufactured with reference to FIG. 2B is stacked to form a unit cell.

FIG. 2A is a cross-sectional diagram showing a configuration just after the injection as a configuration of a separator integrated with a gasket for a fuel cell according to an exemplary embodiment of the present disclosure. Further, FIG. 2B is a cross-sectional diagram showing the separator integrated with the gasket for the fuel cell manufactured by fitting a hole formed in the gasket of FIG. 2A into a burring. FIG. 2C shows that the separator integrated with the gasket for the fuel cell manufactured with reference to FIG. 2B is stacked to form a unit cell.

Figure 3:
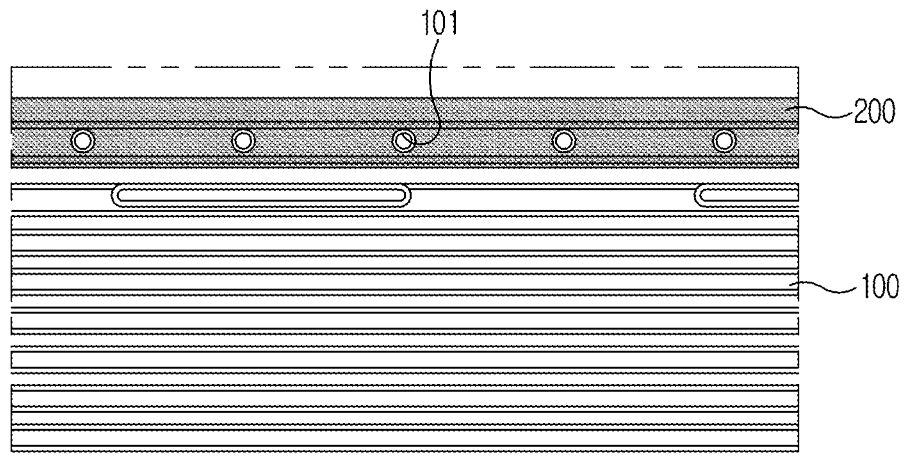
FIG. 3 is a front diagram of the separator integrated with the gasket for the fuel cell according to an exemplary embodiment of the present disclosure.

Further, FIG. 3 is a front diagram of the separator integrated with the gasket for the fuel cell fitted as in FIG. 2B.

As shown in FIG. 2A, the separator integrated with the gasket for the fuel cell according to an exemplary embodiment of the present disclosure is formed in a structure with integrated gasket including a separator 100 formed with a burring part 101 and a gasket 200 bonded to the separator 100.

The burring part 101 may be formed on the separator 100. As shown in FIG. 2B, the burring part 101 may be a means for fixing the gasket 200 by being fitted into a fastening hole 203 formed in the gasket 200.

Referring to FIG. 2A, the gasket 200 includes a first gasket part 201 bonded to the separator 100 and a second gasket part 202 formed to be bent from the first gasket part 201 not to be bonded to the separator 100.

The second gasket part 202 may be integrally formed with the first gasket part 201, and may be formed with the fastening hole 203 corresponding to the burring part 101 to be fitted into the burring part 101. Further, the second gasket part 202 includes a first sealing concave portion 202*a* and a second sealing concave portion 202*b* formed vertically with the fastening hole 203 interposed therebetween. The first sealing concave portion 202*a* and the second sealing concave portion 202*b* may be configurations for providing airtightness performance upon stacking the unit cell. As used with respect to FIGS. 4A and 4B, the concavity of the sealing portions is in relation to separator 100. The concave portions therefore include curvatures in which the radius of curvature is toward the separator 100 when the second gasket part 202 is positioned next to the separator as shown in FIG. 2B. The concave portions may form a hill or bump extending away from the separator when the second gasket portion is positioned next to the separator.

As shown in FIG. 2A, the separator integrated with the gasket for the fuel cell having a structure including the first sealing concave portion 202*a* and the second sealing concave portion 202*b* with the fastening hole 203 interposed therebetween has an undercut shape, and therefore, may be manufactured by installing a slide core in a mold. A process of manufacturing the separator integrated with the gasket for the fuel cell and a mold used therein will be described later.

After manufacturing the separator integrated with the gasket for the fuel cell shown in FIG. 2A, the second gasket part 202 may be rotated based on a bending portion between the second gasket part 202 and the first gasket part 201 to be fitted into the burring part 101 of the separator 100, and through such the fitting process, as shown in FIG. 2B, the separator integrated with the gasket for the fuel cell in which the first sealing concave portion 202*a* and the second sealing concave portion 202*b* may be oriented in the stacked direction may be completely manufactured. The second gasket part 202 may be fitted into and fixed to the burring part 101, but according to another example of the present disclosure, may also be formed to be bonded to the separator 100 by applying an adhesive to one surface of the second gasket part 202.

The finally completed separator with integrated gasket for the fuel cell may be, for example, an anode separator, and as shown in FIG. 2C, may form a unit cell by being stacked together with a cathode separator 400 in which a membrane-electrode assembly 300 and a cathode gasket 500 may be integrally formed.

Meanwhile, FIG. 3 shows a front diagram of the separator integrated with the gasket for the fuel cell according to an exemplary embodiment of the present disclosure. The separator 100 may be formed with a flow field through which reaction gas or coolant moves, and the gasket 200 may be located to form the airtightness outside the flow field. Therefore, since the gasket 200 may be installed along the outline requiring the airtightness, a plurality of burring parts

101 may be formed along the outline. FIG. 3 is a front diagram showing a part of the separator, and as shown in FIG. 3, the plurality of burring parts 101 may be formed outside the separator 100.

In an exemplary embodiment, the burring part 101 may be composed of the plurality of burring parts 110 aligned and formed at regular intervals. Further, the fastening hole 203 formed in the second gasket part 202 may be composed of a plurality of fastening holes 203 aligned and formed at intervals corresponding to the plurality of burring parts 101. FIG. 3 shows a state where the burring part 101 and the fastening hole 203 may be formed to be disposed in a row at regular intervals, and the burring part 101 may be fitted into the fastening hole 203 of the second gasket part 202.

Further, the second gasket part 202 may include the first sealing concave portion 202*a* and the second sealing concave portion 202*b* formed with the plurality of fastening holes 203 formed in a row interposed therebetween, and as shown in FIG. 3, the first sealing concave portion 202*a* and the second sealing concave portion 202*b* may be formed to extend in a direction in which the fastening holes 203 may be aligned.

Figure 4A:
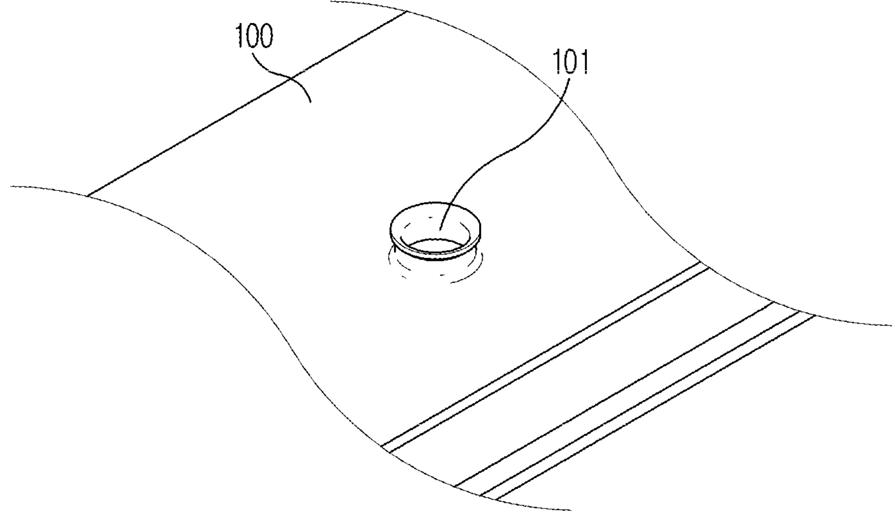
FIG. 4A is an enlarged perspective diagram showing a burring part formed on the separator.

A specific structure of the burring part 101 formed on the separator will be described with reference to FIGS. 4A and 4B. FIG. 4A is an enlarged perspective diagram showing the burring part formed on the separator, and FIG. 4B is a cross-sectional diagram of the burring part formed on the separator.

Figure 4B:
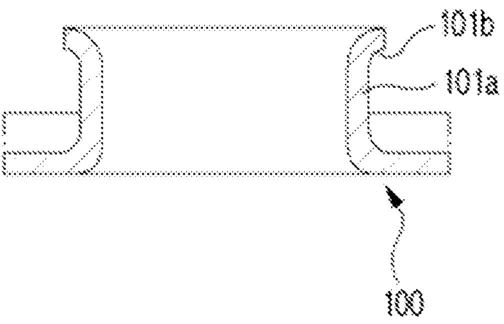
FIG. 4B is a cross-sectional diagram showing the burring part formed on the separator.

As shown in FIGS. 4A and 4B, the burring part 101 according to the present disclosure may be installed on the separator 100, and may be formed on the portion requiring the airtightness outside the separator 100. As shown in FIG. 4A, the burring part 101 may be formed on the separator 100 through a burring processing, and may have a structure of vertically protruding from a hole formed in the separator 100.

In an exemplary embodiment, the burring part 101 may be formed to be coupled to the fastening hole 203 formed in the second gasket part 202 to fix the second gasket part 202. To this end, as shown in FIG. 4B, according to an exemplary embodiment of the present disclosure, the burring part 101 formed on the separator 100 may include a cylindrical first flange portion 101*a* extending vertically, and a ring-shaped second flange portion 101*b* formed to be horizontally bent and extend outward from the first flange portion 101*a*. The first flange portion 101*a* may be formed at a radius capable of being inserted into the fastening hole 203, and the second flange portion 101*b* may have a shape being expanded outward so that the first flange portion 101*a* inserted into the fastening hole 203 may not be released and firmly fastened and fixed. Meanwhile, an exemplary embodiment of the present disclosure exemplifies the burring part 101 having the circular cross-sectional structure and the fastening hole 203 corresponding thereto in consideration of the manufacturing convenience, but the present disclosure is not limited to such an example, and it can be used without limitation in its shape as long as it can fix the second gasket part 202 by being fitted into the second gasket part 202. For example, the burring part may also have a triangular or quadrangular cross-sectional structure.

Hereinafter, a process of manufacturing the separator integrated with the gasket for the fuel cell having the cross-sectional structure shown in FIG. 2A will be described with reference to FIG. 5.

FIG. 5 sequentially shows the process of manufacturing the separator integrated with the gasket for the fuel cell according to a first exemplary embodiment of the present disclosure.

As shown in FIGS. 5(*a*)-5(*d*), the method for manufacturing the separator integrated with the gasket for the fuel cell according to the exemplary embodiment of the present disclosure includes a separator seating step of seating the separator 100 formed with the burring part 101 on a lower core 1 (see FIG. 5(*a*)), a step of forming a cavity in a preset shape within the mold by moving the upper core 2, a first slide core 3 and a second slide core 4 in a mold closing direction, and injecting molten resin into the cavity (see FIG. 5(*b*)), a step of cooling the molten resin, and then moving an upper core 2, the first slide core 3, and the second slide core 4 in the mold opening direction (see (c) of FIG. 5), and a step of taking out the separator integrated with the gasket (see (d) of FIG. 5). The method described herein includes directions for closing (mold closing direction) and opening (mold opening direction) the mold. The opening and closing directions are not intended to denote a single linear or axial direction. Instead, these directions are intended to describe the relative movement of one or more component parts to open or close the mold structure.

Specifically, as shown in FIG. 5(*a*), the injection of the gasket 200 may be prepared in a state of injecting and seating the separator 100 on the lower core 1. At this time, the separator 100 may be seated in a state where the burring part 101 for fixing the second gasket part 202 can be processed in advance.

When the separator 100 is seated in a right location, the first slide core 3, the second slide core 4, and the upper core 2 may be moved in the mold closing direction, thereby completing the shape of the cavity according to the shape of the gasket 200 to be injected and molded. In other words, as shown in FIG. 5(*b*), an assembling step may be performed while vertically moving the upper core 2 downward, and horizontally moving the first slide core 3 and the second slide core 4. If the movement up to the final locations required by the respective cores is completed, the molten resin may be injected through a nozzle. The nozzle for injecting the molten resin may be formed at a location suitable for injecting the molten resin into the cavity, and preferably, formed near the upper core 2 and configured so that the molten resin may be moved by gravity. A cooling process may be performed after injecting the molten resin, and molding and bonding may be simultaneously performed depending upon the injection of the gasket. Further, as the molten resin, a rubber material may be used in consideration of the airtightness performance, but the molten resin is not limited to such an example.

The first slide core 3 and the second slide core 4 may be formed in a form capable of manufacturing the shapes required by the first gasket part 201 and the second gasket part 202, and preferably, the first slide core 3 includes a projection protruding toward the second slide core 4, and may be configured to form the fastening hole 203 by the projection upon assembling. Further, the second slide core 4 may be formed with a first groove portion and a second groove portion extending horizontally. Therefore, the second gasket part 202 may be formed with the first sealing concave portion 202*a* and the second sealing concave portion 202*b* with the fastening hole 203 interposed therebetween by the first groove portion and the second groove portion of the second slide core 4.

After injecting the molten resin, if the injected product may be completed depending upon the required shape after a resin curing (cooling) process, as shown in FIG. 5(*c*), the mold may be open by horizontally retreating the first slide core 3 and the second slide core 4, respectively, and vertically moving the upper core 2 upward. When the mold is open, as shown in FIG. 5(*d*), the separator integrated with the gasket for the fuel cell whose injection-molding has been completed may be taken out. Further, a fastening step of fitting the burring part 101 into the fastening hole 203 by moving the second gasket part 202 of the taken-out separator with integrated gasket toward the separator 100 may be additionally performed.

Figure 6:
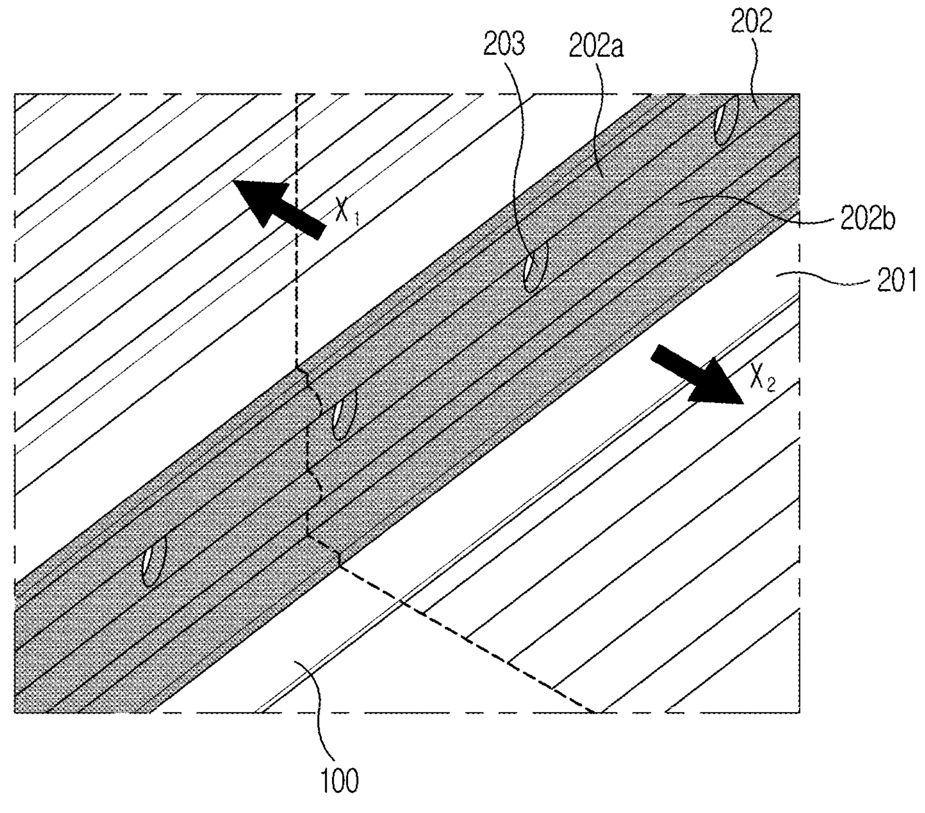
FIG. 6 schematically shows a configuration of the separator integrated with the gasket for the fuel cell manufactured according to the process of FIGS. 5(*a*)-5(*d*)

FIG. 6 schematically shows a configuration of the separator integrated with the gasket for the fuel cell manufactured through such a process, and as the respective slide cores retreat in a retreating direction (X1) of the first slide core 3 and a retreating direction (X2) of the second slide core 4, the separator integrated with the gasket for the fuel cell formed with the second gasket part 202 substantially perpendicular to the first gasket part 201 may be easily taken out. In other words, according to the exemplary embodiment of the present disclosure, some molds may be horizontally moved by the slide core, thereby easily separating the product from the mold despite the structure of the second gasket part 202 with the undercut shape.

According to an exemplary embodiment of the present disclosure, in forming the bending portion between the first gasket part 201 and the second gasket part 202, it may be possible to mold the shape of the bending portion to be round, thereby further improving degradation performance, etc. on a boundary portion between the first gasket part 201 and the second gasket part 202. Although for the separator integrated with the gasket for the fuel cell, the second gasket part 202 may be bent and fitted into the burring part, damage such as breakage does not occur due to the basic physical property (tensile, elongation, and hardness) of the rubber material generally used as the material of the gasket. However, considering the durability of the fuel cell, the possibility of degradation on the boundary portion cannot be fully ignored, and therefore, still another implementation example of the present disclosure may be characterized by being formed in a shape of a rounded boundary portion in a curved shape to improve the performance of the boundary portion.

In this regard, FIGS. 7(*a*)-7(*d*) sequentially shows a process of manufacturing a separator integrated with a gasket for a fuel cell according to a second exemplary embodiment of the present disclosure.

In FIGS. 7(*a*)-7(*d*), the basic order of the process may be the same as in the exemplary embodiment of FIG. 5(*a*)-(*d*), but there may be a difference in the shape of the slide core. In other words, in an example of FIGS. 7(*a*)-7(*d*), a shape of the boundary portion, that is, the bending portion between the first gasket part 201 and the second gasket part 202 may be characterized by being formed to be round, and to this end, a lower portion of the first slide core 3 and a lower portion of the second slide core 4 have a shape suitable for molding the gasket with the rounded shape. Therefore, as shown in FIG. 7(*b*), etc., the first slide core 3 and the second slide core 4 have a core lower shape that may allow the bending portion between the first gasket part 201 and the second gasket part 202 to be formed to be round upon closing the mold. As shown in FIG. 7(*d*), the separator integrated with the gasket for the fuel cell manufactured through such a process has upper and lower surfaces, which connect the first gasket part 201 and the second gasket part 202, respectively, in a rounded shape.

Figure 8A:
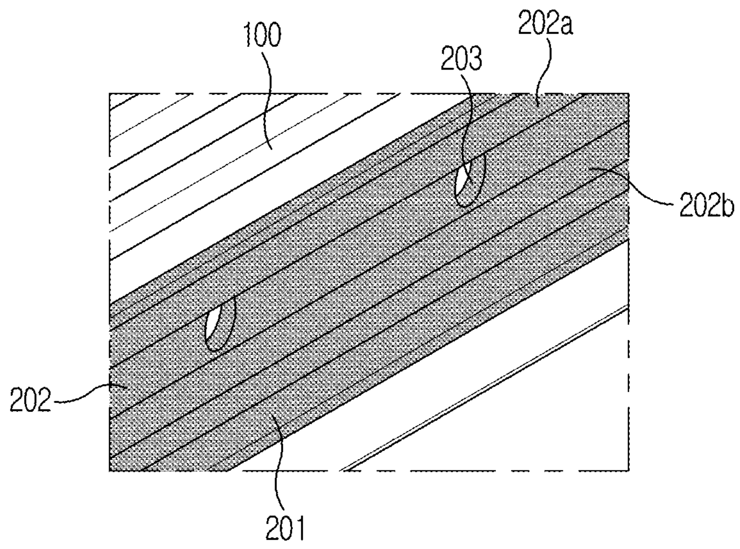
FIG. 8A shows the separator integrated with the gasket for the fuel cell manufactured according to the exemplary embodiment of FIGS. 5(*a*) to 5(*d*)
Figure 8B:
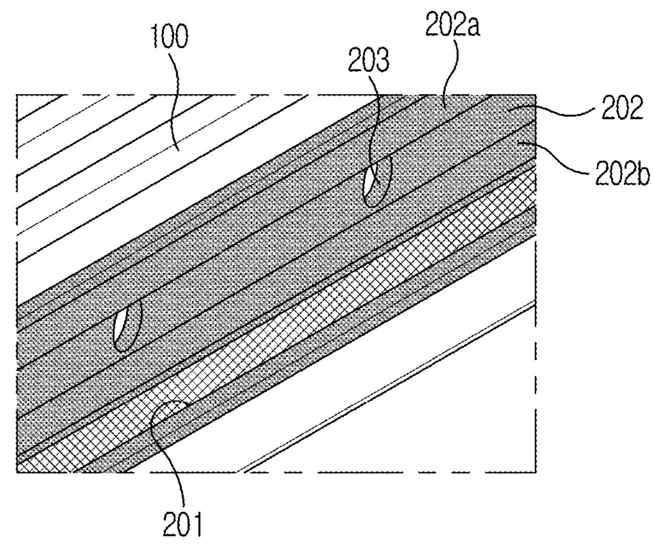
FIG. 8B shows the separator integrated with the gasket for the fuel cell manufactured according to the exemplary embodiment of FIGS. 7(*a*) to 7(*d*)

In this regard, FIGS. 8A and 8B show partial perspective diagrams of the separator integrated with the gasket for the fuel cell manufactured according to the first exemplary embodiment and the separator integrated with the gasket for the fuel cell manufactured according to the second exemplary embodiment, and may be provided to compare the separators integrated with the gasket for the fuel cell manufactured according to the first and second exemplary embodiments.

Figure 8C:
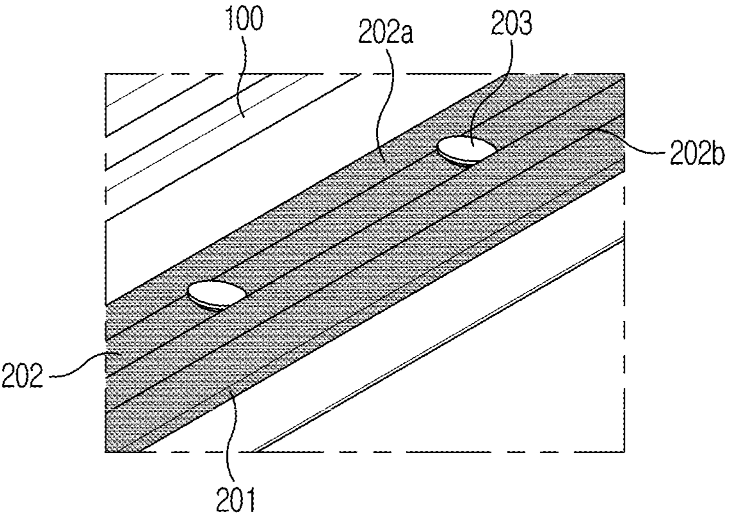
FIG. 8C shows the separator integrated with the gasket for the fuel cell in which a gasket hole may be fastened to a burring part.

Further, FIG. 8C shows the separator integrated with the gasket for the fuel cell in which the fastening hole 203 may be fastened to the burring part 101.

When being compared with the separator integrated with the gasket for the fuel cell manufactured according to the exemplary embodiment of FIGS. 5(*a*)-5(*d*), the separator integrated with the gasket for the fuel cell manufactured according to the exemplary embodiment of FIGS. 7(*a*)-7(*d*) has the bending portion in the rounded shape. Due to the difference in the shape of the bending portion, as shown in FIG. 8C, in fitting and assembling the burring part 101 into the fastening hole 203 by rotating the second gasket part 202, the stress acting on the bending portion may be alleviated, thereby suppressing the durable degradation of the bending portion of the gasket.

Figure 9A:
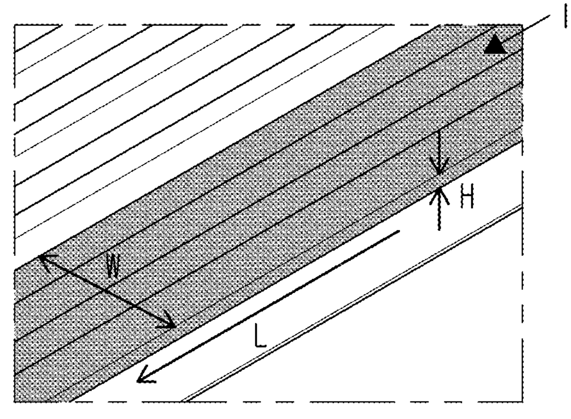
FIGS. 9(*a*) to 9(*b*) are diagrams for explaining a flow resistance upon injection-molding of the separator integrated with the gasket for the fuel cell according to the present disclosure.
Figure 9B:
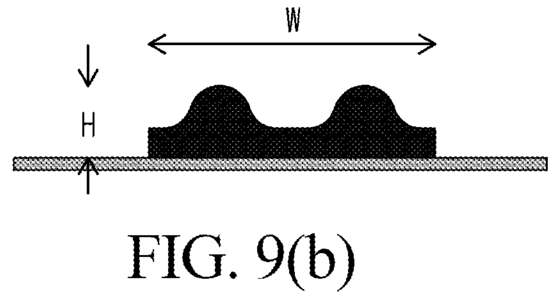
Figure 10A:
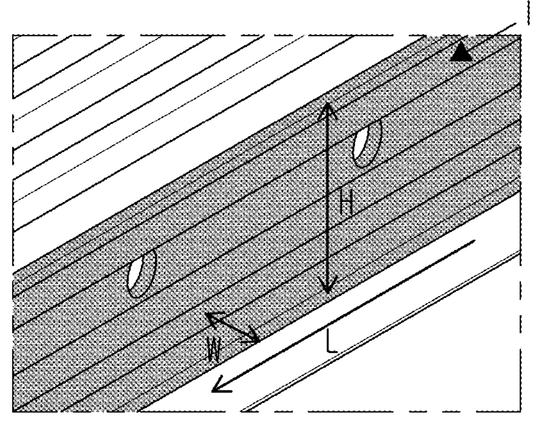
FIGS. 10(*a*) to 10(*b*) are diagrams for explaining the flow resistance upon injection-molding of the conventional separator with integrated gasket through the comparison with the example according to the present disclosure.
Figure 10B:
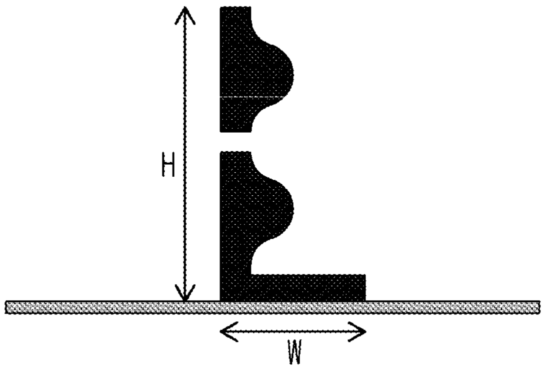

Meanwhile, FIGS. 9 and 10 may be diagrams for comparing and explaining the advantages of the method for manufacturing the separator integrated with the gasket for the fuel cell according to an exemplary embodiment of the present disclosure. In particular, FIG. 9 is a diagram for explaining a flow resistance upon injection-molding of the separator integrated with the gasket for the fuel cell according to the present disclosure, and FIG. 10 is a diagram for explaining the flow resistance upon injection-molding of the conventional separator with integrated gasket through the comparison with the example according to the present disclosure.

Upon injection-molding, a flow resistance $\Delta P$ has the following correlation in relation to a molding length, a molding width, and a molding height.

$$\Delta P(\text{flow resistance}) \partial L(\text{molding length}) \quad \text{[Correlation 1]}$$

$$\Delta P(\text{flow resistance}) \partial 1/W(\text{molding width}) \quad \text{[Correlation 2]}$$

$$\Delta P(\text{flow resistance}) \partial 1/H^3(\text{molding height}) \quad \text{[Correlation 3]}$$

Considering a flow direction (I) of the molten resin, the conventional separator with integrated gasket for the fuel cell corresponds to a case where the molding width (W) may be relatively larger than the molding height (H), and has a relatively large flow resistance.

On the other hand, the structure of the separator integrated with the gasket for the fuel cell according to an exemplary embodiment of the present disclosure largely increase in the molding height compared to that of the conventional structure upon molding, and therefore, the flow resistance ($\Delta P$) may be relatively reduced. Therefore, it may be possible to reduce the deformation of the separator and the overflow of the burr upon molding, thereby improving productivity. Further, it may be possible to inject the thin-film gasket in a thickness relatively smaller than that of the conventional separator structure, thereby reducing the thickness of the gasket to reduce the pitch of the cell.

While the specific exemplary embodiment of the present disclosure has been shown and described, it will be apparent to those skilled in the art that the present disclosure may be variously improved and changed without departing from the technical spirit of the present disclosure provided by the appended claims.

What is claimed is:

1. A separator with integrated gasket for a fuel cell comprising:

the separator formed with at least one burring part;

a first gasket part bonded to only one surface of the separator; and a second gasket part integrally formed with the first gasket part, and bent from the first gasket part and not bonded to the separator, wherein the second gasket part is formed with at least one fastening hole, wherein a number of fastening holes corresponds to the number of burring parts and each fastening hole of the at least one fastening hole configured to be fitted onto a respective each burring part of the at least one burring part;

wherein the at least one burring part is composed of a plurality of burring parts aligned and formed at recurring intervals; and wherein the at least one fastening hole is composed of a plurality of fastening holes aligned and formed at intervals corresponding to the plurality of burring parts.

2. The separator with integrated gasket of claim 1, wherein the second gasket part comprises: a first sealing concave portion and a second sealing concave portion formed with the plurality of fastening holes formed in a row interposed therebetween, and the first sealing concave portion and the second sealing concave portion are formed to extend in a direction in which the plurality of fastening holes are aligned.

3. The separator with integrated gasket of claim 1, wherein the first gasket part and the second gasket part are connected to each other by a bending portion, and wherein the second gasket part is fixed by one of the at least one burring part of the separator by rotating the second gasket part toward the separator to fit the one of the at least one burring part into one of the at least one fastening hole, based on the bending portion.

4. The separator with integrated gasket of claim 3, wherein the bending portion has upper and lower surfaces, which connect the first gasket part and the second gasket part, respectively, in a rounded shape.

5. The separator with integrated gasket of claim 1, wherein the at lest one burring part comprises: a cylindrical first flange portion extending vertically and a ring-shaped second flange portion formed to horizontally extend outward from the first flange portion.

* * * * *